(12) United States Patent
Green

(10) Patent No.: US 11,177,594 B2
(45) Date of Patent: Nov. 16, 2021

(54) HOUSING FOR PLUGGABLE MODULE

(71) Applicant: II-VI DELAWARE, INC., Wilmington, DE (US)

(72) Inventor: Eric T. Green, Corning, NY (US)

(73) Assignee: II-VI DELAWARE, INC., Wilmington, DE (US)

( * ) Notice: Subject to any disclaimer, the term of this patent is extended or adjusted under 35 U.S.C. 154(b) by 0 days.

(21) Appl. No.: 16/844,109

(22) Filed: Apr. 9, 2020

(65) Prior Publication Data

US 2021/0320442 A1 Oct. 14, 2021

(51) Int. Cl.
*H04B 10/00* (2013.01)
*H01R 12/72* (2011.01)
*G02B 6/42* (2006.01)
*H04B 10/40* (2013.01)
*H01R 12/70* (2011.01)

(52) U.S. Cl.
CPC .......... *H01R 12/721* (2013.01); *G02B 6/428* (2013.01); *G02B 6/4261* (2013.01); *H01R 12/7064* (2013.01); *H04B 10/40* (2013.01)

(58) Field of Classification Search
CPC combination set(s) only.
See application file for complete search history.

(56) References Cited

U.S. PATENT DOCUMENTS

| | | | | | |
|---|---|---|---|---|---|
| 4,226,491 | A | * | 10/1980 | Kazama | H05K 1/02 361/759 |
| 5,107,404 | A | * | 4/1992 | Tam | H04B 1/38 361/736 |
| 5,280,191 | A | * | 1/1994 | Chang | G02B 6/4246 257/433 |
| 6,179,627 | B1 | * | 1/2001 | Daly | H01R 13/6658 439/354 |
| 6,347,954 | B1 | * | 2/2002 | Jones | G02B 6/4246 439/138 |
| 6,530,785 | B1 | * | 3/2003 | Hwang | H01R 13/6582 439/358 |
| 6,609,838 | B1 | * | 8/2003 | Branch | G02B 6/4246 361/752 |
| 6,633,420 | B2 | * | 10/2003 | Huang | H01R 12/7076 174/53 |
| 7,118,281 | B2 | * | 10/2006 | Chiu | G02B 6/3893 385/53 |
| 7,125,261 | B2 | * | 10/2006 | Yoshikawa | G02B 6/4201 439/76.1 |

(Continued)

*Primary Examiner* — Agustin Bello
(74) *Attorney, Agent, or Firm* — Blank Rome LLP

(57) ABSTRACT

A housing for a pluggable module may include a first seating protrusion, a second seating protrusion, and a locking protrusion. The first seating protrusion may have a first seating surface facing a first direction. The second seating protrusion may have a second seating surface facing a second direction opposite the first direction. The second seating surface may be positioned parallel to the first seating surface. The second seating protrusion may be offset relative to the first seating surface in a direction parallel and a direction perpendicular to the first seating surface. The locking protrusion may have a locking surface facing the first direction. The locking surface may be positioned parallel to the first seating surface. The locking surface may be offset relative to the first seating surface in the direction perpendicular to the first seating surface.

19 Claims, 10 Drawing Sheets

(56) References Cited

U.S. PATENT DOCUMENTS

| | | | | |
|---|---|---|---|---|
| 7,154,752 B2* | 12/2006 | Sato | G02B 6/3897 | 361/715 |
| 7,223,915 B2* | 5/2007 | Hackman | H01R 13/6658 | 174/36 |
| 7,486,524 B2* | 2/2009 | Ice | G02B 6/4277 | 361/752 |
| 7,566,246 B2* | 7/2009 | Moore | G02B 6/4201 | 439/607.01 |
| 7,680,389 B2* | 3/2010 | Shaw | G02B 6/4256 | 385/139 |
| 7,798,843 B1* | 9/2010 | Wu | H01R 9/032 | 439/455 |
| 7,824,113 B2* | 11/2010 | Wong | G02B 6/4246 | 385/92 |
| 8,002,583 B2* | 8/2011 | van Woensel | H01R 13/506 | 439/607.56 |
| 8,267,718 B2* | 9/2012 | Straka | H01R 13/6471 | 439/497 |
| 8,599,567 B2* | 12/2013 | Wu | G02B 6/4261 | 361/752 |
| 9,478,910 B2* | 10/2016 | Nonen | H01R 13/6335 | |
| 9,929,500 B1* | 3/2018 | Ista | G02B 6/4261 | |
| 9,972,930 B1* | 5/2018 | Skepnek | H01R 12/772 | |
| 10,193,268 B1* | 1/2019 | Chow | H01R 13/40 | |
| 2011/0195614 A1* | 8/2011 | Wu | H01R 13/6658 | 439/676 |
| 2012/0220152 A1* | 8/2012 | Wu | H01R 13/6581 | 439/350 |
| 2013/0017711 A1* | 1/2013 | Houtz | H01R 13/6658 | 439/374 |
| 2014/0120779 A1* | 5/2014 | Lloyd | H01R 12/53 | 439/660 |
| 2016/0062057 A1* | 3/2016 | Seki | G02B 6/3898 | 385/53 |

* cited by examiner

HOUSING FOR PLUGGABLE MODULE

BACKGROUND

Communication modules, such as optoelectronic transceiver or transponder modules configured to transmit and receive electrical or optical data signals, are used in electronic and optoelectronic communication. Some modules are pluggable, which permits the module to be inserted into and removed from a receptacle of a host device, such as a host computer, switching hub, network router, or switch box. Each module typically communicates with the host device by transmitting or receiving electrical signals to or from the host device. These electrical signals can also be transmitted by or to the module outside the host device as optical or electrical signals.

The subject matter claimed herein is not limited to implementations that solve any disadvantages or that operate only in environments such as those described above. Rather, this background is only provided to illustrate one example technology area where some implementations described herein may be practiced.

SUMMARY

This Summary introduces a selection of concepts in a simplified form that are further described below in the Detailed Description. This Summary is not intended to identify key features or essential characteristics of the claimed subject matter, nor is it intended to be used as an aid in determining the scope of the claimed subject matter.

In at least one aspect, a housing for a pluggable module may include a first seating protrusion, a second seating protrusion, and a locking protrusion. The first seating protrusion may have a first seating surface facing a first direction. The second seating protrusion may have a second seating surface facing a second direction opposite the first direction. The second seating surface may be positioned parallel to the first seating surface. The second seating protrusion may be offset relative to the first seating surface in a direction parallel to the first seating surface and a direction perpendicular to the first seating surface. The locking protrusion may have a locking surface facing the first direction. The locking surface may be positioned parallel to the first seating surface. The locking surface may be offset relative to the first seating surface in the direction perpendicular to the first seating surface.

Additional features and advantages will be set forth in the description which follows, and in part will be obvious from the description, or may be learned by practice. The features and advantages may be realized and obtained by means of the instruments and combinations particularly pointed out in the appended claims. These and other features will become more fully apparent from the following description and appended claims.

DETAILED DESCRIPTION

Reference will now be made to the drawings to describe various aspects of example embodiments of the invention. The drawings are diagrammatic and schematic representations of such example embodiments, and are not limiting, nor are they necessarily drawn to scale.

Figure 1A:
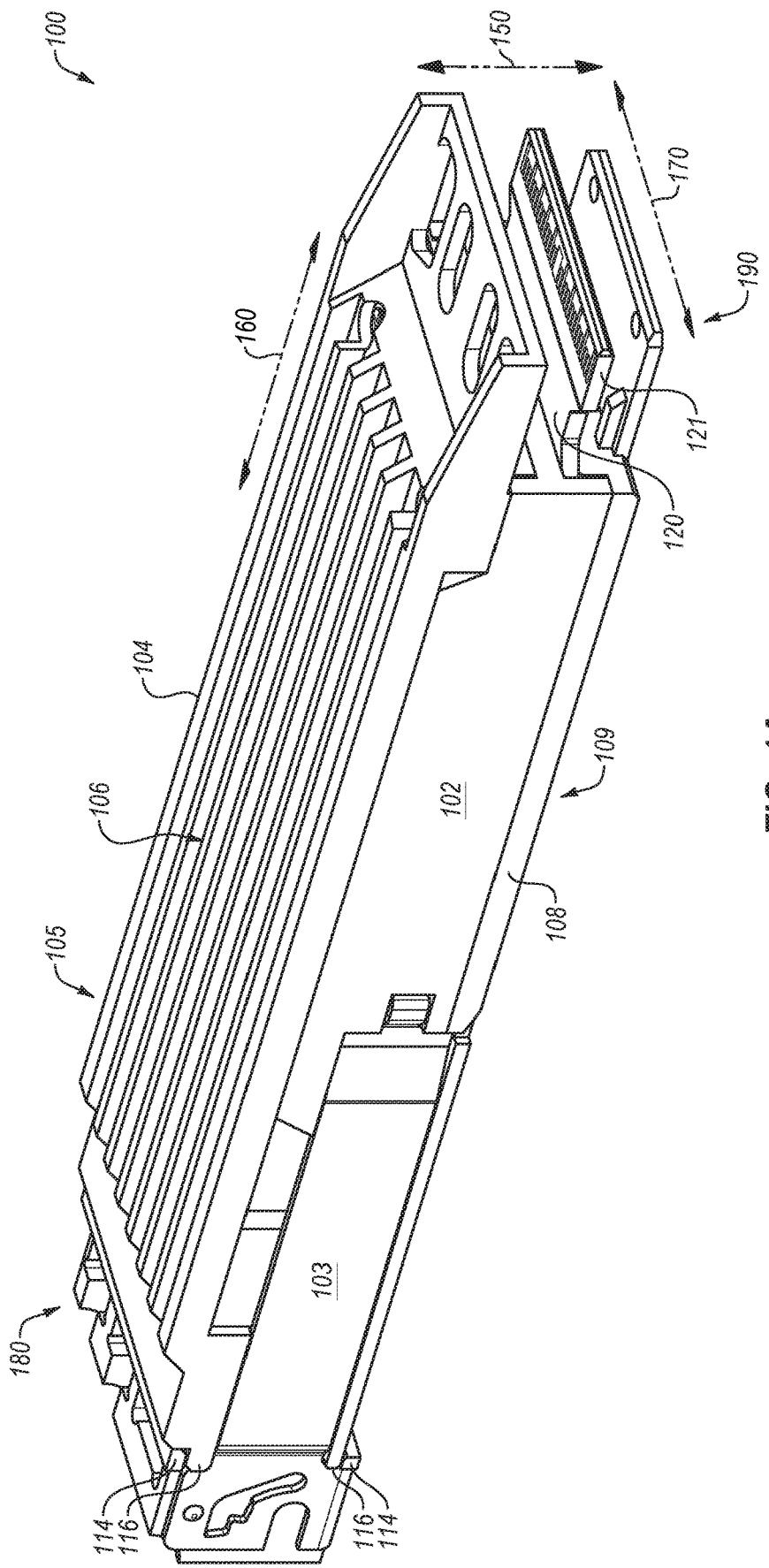
FIG. 1A shows a top perspective view of an example optoelectronic transceiver module.
Figure 1B:
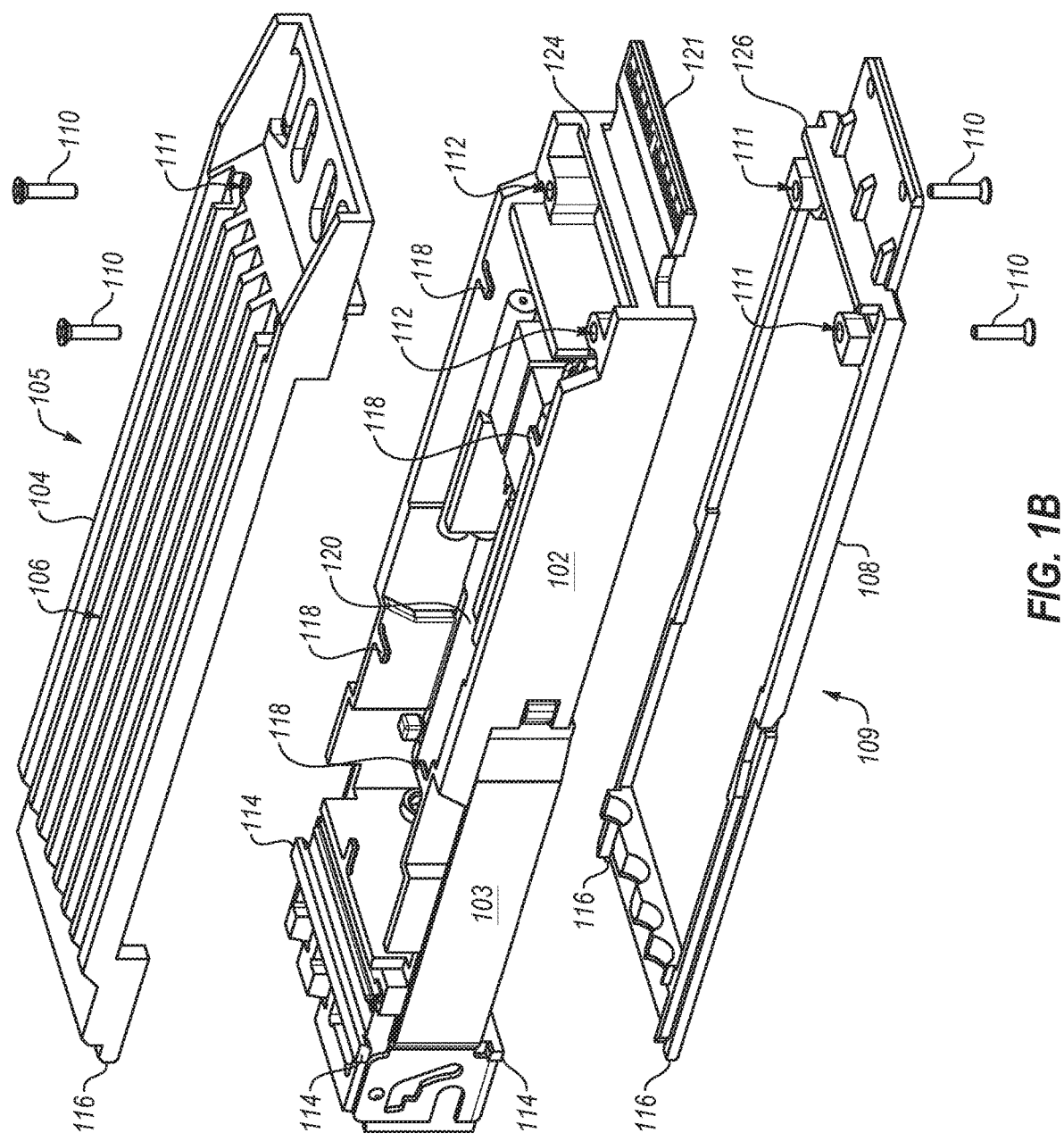
FIG. 1B shows an exploded top perspective view of the example optoelectronic transceiver module of FIG. 1A.

FIG. 1A shows a top perspective view and FIG. 1B shows an exploded top perspective view of an example optoelectronic transceiver module 100 (hereinafter "transceiver 100"). For clarity, directions relative to the transceiver 100 are described herein as a vertical direction 150, a longitudinal direction 160, and a lateral direction 170. Furthermore, the transceiver 100 is described herein as having a top 105, a bottom 109, a front 180, and a rear 190.

The transceiver 100 includes a housing 102, a top cover 104, and a bottom cover 108. Optionally, the top cover 104 or the bottom cover 108 may include a heat sink 106.

The top cover 104 and the bottom cover 108 may include engagement fingers 116, which may be positioned between cover retention protrusions 114 of the housing 102 and the remainder of the housing 102. Fasteners 110 (shown in FIG. 1B) may pass through openings 111 (shown in FIG. 1B) defined by the top cover 104 and the bottom cover 108 to engage with fastener retention holes 112 of the housing 102. When the fasteners 110 are engaged with the fastener retention holes 112 and the engagement fingers 116 are positioned between the cover retention protrusions 114 and the remainder of the housing 102, the top cover 104 and the bottom cover 108 may be held in place relative to the housing 102. The housing 102, the top cover 104, and the bottom cover 108 may together form an enclosure to house, for example, a PCB 120.

In some embodiments, the fastener retention holes 112 may be defined by the housing 102 such that each of the fastener retention holes 112 receives fasteners 110 from both the top 105 and the bottom 109 of the housing 102. Alternately, the housing 102 may define the fastener retention holes 112 such that each of the fastener retention holes 112 receives just one of the fasteners 110. The fasteners 110 and the fastener retention holes 112 may be sized such that the fasteners 110 may secure both the top cover 104 and the bottom cover 108 to the housing 102. In some configurations, one or more of the fasteners 110, such as the fasteners 110 associated with the bottom cover 108, may facilitate confinement of the PCB 120 in the longitudinal direction 160 or the lateral direction 170.

The PCB 120 includes an edge connector 121 that extends beyond the enclosure formed by the housing 102, the top cover 104, and the bottom cover 108. The edge connector 121 may form a conductive or communicative connection with a counterpart mating connector of a host device into which the transceiver 100 may be inserted. The counterpart mating connector of the host device may be located at a precise position relative to a receptacle into which the transceiver 100 is inserted. Accordingly, for example, the PCB 120 of the transceiver 100 may be encouraged to be located at a precise position relative to the housing 102, the top cover 104, and the bottom cover 108 such that the edge connector 121 may physically complete the conductive or communicative connection with the counterpart mating connector of the host device.

The housing 102 may include a crossbar 124 and the bottom cover 108 may include a counterpart crossbar 126. The crossbar 124 and the crossbar 126 may encourage the edge connector 121 of the PCB 120 to be located at a particular position in the vertical direction 150. For instance, the crossbar 124 and the crossbar 126 may act to clamp the PCB 120 when the bottom cover 108 is affixed to the housing 102. The crossbar 124 and the crossbar 126, with other features described herein, may further encourage the PCB 120 to be positioned parallel to the longitudinal direction 160 and perpendicular to the vertical direction 150 such that the edge connector 121 may be oriented to facilitate the conductive or communicative connection with the counterpart mating connector of the host device.

In some configurations, the transceiver 100 may include transceiver release arms 103, which may facilitate connection to and release from the receptacle of the host device. The general structure of the transceiver release arms 103 may be associated with a pre-defined form factor of optoelectronic transceiver module. However, the transceiver 100 and the embodiments described herein are not limited to any particular optoelectronic transceiver module form factor or form factors. Rather, embodiments described herein may be employed in a variety of optoelectronic transceiver module form factors. For instance, embodiments described herein may be employed in optoelectronic transceiver module form factors that position a PCB edge connector relative to a transceiver housing at a defined position to facilitate a conductive or communicative connection with a counterpart mating connector of a host device.

The housing 102 may include fiber retention tabs 118, which may facilitate positioning optical fibers within an enclosure space during assembly of the transceiver 100.

Figure 2A:
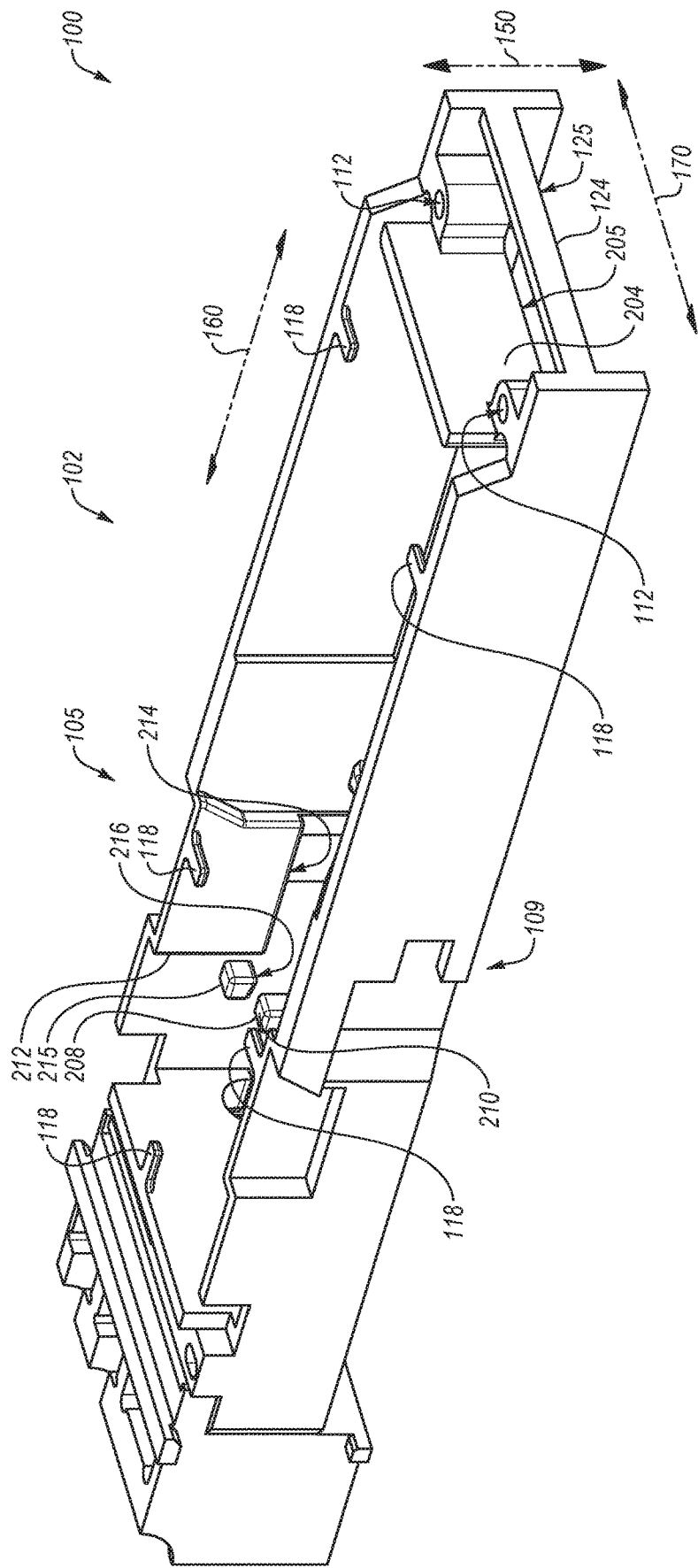
FIG. 2A shows a top perspective view of a housing of FIGS. 1A and 1B.
Figure 2B:
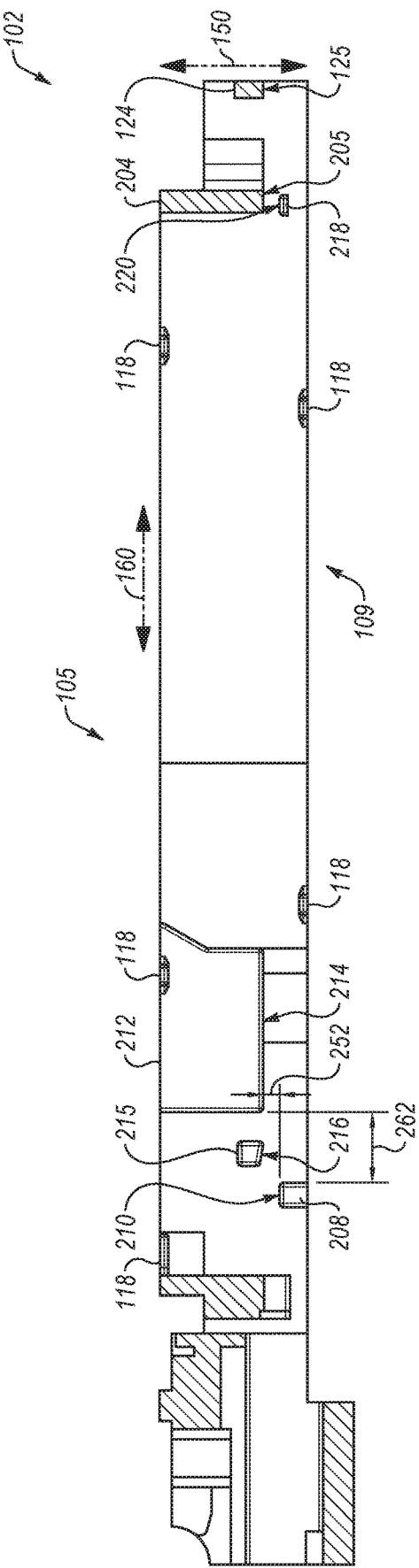
FIG. 2B shows a cutaway side view of the housing of FIG. 2A.

FIG. 2A shows a top perspective view and FIG. 2B shows a side view of the housing 102. With continued reference to FIG. 1A and FIG. 1B, the housing 102 may include a cross-wall 204, a first seating protrusion 208, a ramp protrusion 215, a second seating protrusion 212, and a locking protrusion 218. In some configurations, the housing 102 may include mirrored counterparts to the first seating protrusion 208, the ramp protrusion 215, the second seating protrusion 212, and the locking protrusion 218 located in counterpart locations on the portion of the housing 102 facing the first seating protrusion 208, the ramp protrusion 215, the second seating protrusion 212, and locking protrusion 218. Thus, for example, in some configurations, the housing 102 may be described as including a pair of the first seating protrusion 208, a pair of the ramp protrusion 215, a pair of the second seating protrusion 212, and a pair of the locking protrusion 218.

The ramp protrusion 215 may assist in the PCB 120 placement during assembly and may be omitted. For instance, a ramp surface 216 of the ramp protrusion 215 may act as a guide for the PCB 120 as it is inserted into the housing 102. In some embodiments, the ramp surface 216 may be integrated into the second seating protrusion 212. For instance, the second seating protrusion 212 may define the second seating surface 214 and the ramp surface 216 as two portions of a compound surface.

The first seating protrusion 208, the second seating protrusion 212, the cross-wall 204, the crossbar 124, and the locking protrusion 218 may facilitate positioning of the PCB 120 relative to the housing 102. The cross-wall 204 may further facilitate enclosing the volume of the housing to discourage infiltration of contaminants such as dust or metal shavings. Alternately or additionally, the cross-wall 204 may encourage containment of optical fibers within the housing 102.

The PCB 120 may be positioned particularly by the PCB 120 being seated on a first seating surface 210 of the first seating protrusion 208, a second seating surface 214 of the second seating protrusion 212, a cross-wall surface 205 of the cross-wall 204, the crossbar surface 125 of the crossbar 124, and a locking surface 220 of the locking protrusion 218. In some embodiments, the PCB may be seated on a subset of the first seating surface 210, the second seating surface 214, the cross-wall surface 205, the crossbar surface 125, and the locking surface 220.

The first seating surface 210 may face an opposite direction as the second seating surface 214. The first seating surface 210 may further be offset from the second seating surface 214. For example, the first seating protrusion 208 and the first seating surface 210 may be offset 252 from the second seating protrusion 212 in the vertical direction 150 and offset 262 from the second seating protrusion 212 in the longitudinal direction 160.

The first seating surface 210 may be offset 252 in the vertical direction 150 by a height of a PCB to be assembled with the housing 102. Such an offset 252 may be in a direction that allows the PCB to fit between and contact both the first seating surface 210 and the second seating surface 214. In some configurations, the offset 252 may be less than the height of the PCB to promote friction between the PCB, and the first seating surface 210 and the second seating surface 214.

The first seating surface 210 and the second seating surface 214 may be further offset 262 in the longitudinal direction 160 by a distance that allow the PCB to be inserted between the first seating surface 210 and the second seating surface 214 on an angle that allows the PCB to be inserted into the housing 102. The offset 262 may be further selected such that a radius of curvature that may be introduced to the PCB between the first seating surface 210 and the second seating surface 214 may not damage the PCB.

The offset 252 and the vertical direction 150 may also be described as being in a direction perpendicular to the first seating surface 210, to the second seating surface 214, or to the locking surface 220. The offset 262 and the longitudinal direction 160 may also be described as being in a direction parallel to the first seating surface 210, to the second seating surface 214, to the locking surface 220.

The locking protrusion 218 may be positioned such that the locking surface 220 is in plane with and faces the same direction as the first seating surface 210. That is, the first seating surface 210 and the locking surface 220 may contact a same side of the PCB 120 assembled to the housing 102 when the PCB 120 is horizontal.

The second seating protrusion 212 may be positioned such that the second seating surface 214 is in plane with and faces the same direction as the crossbar surface 125. In configurations that include the cross-wall 204, the cross-wall 204 may be positioned such that the cross-wall surface 205 is in plane with and faces the same direction as the second seating surface 214 and the crossbar surface 125. That is, the cross-wall surface 205, the crossbar surface 125, and the second seating surface 214, or combinations thereof, may contact a same side of a PCB assembled to the housing 102 when the PCB is horizontal.

FIGS. 3A-3F show various views of the housing 102 and the PCB 120 in various relative positions associated with an example assembly process of the transceiver 100.

Figure 3A:
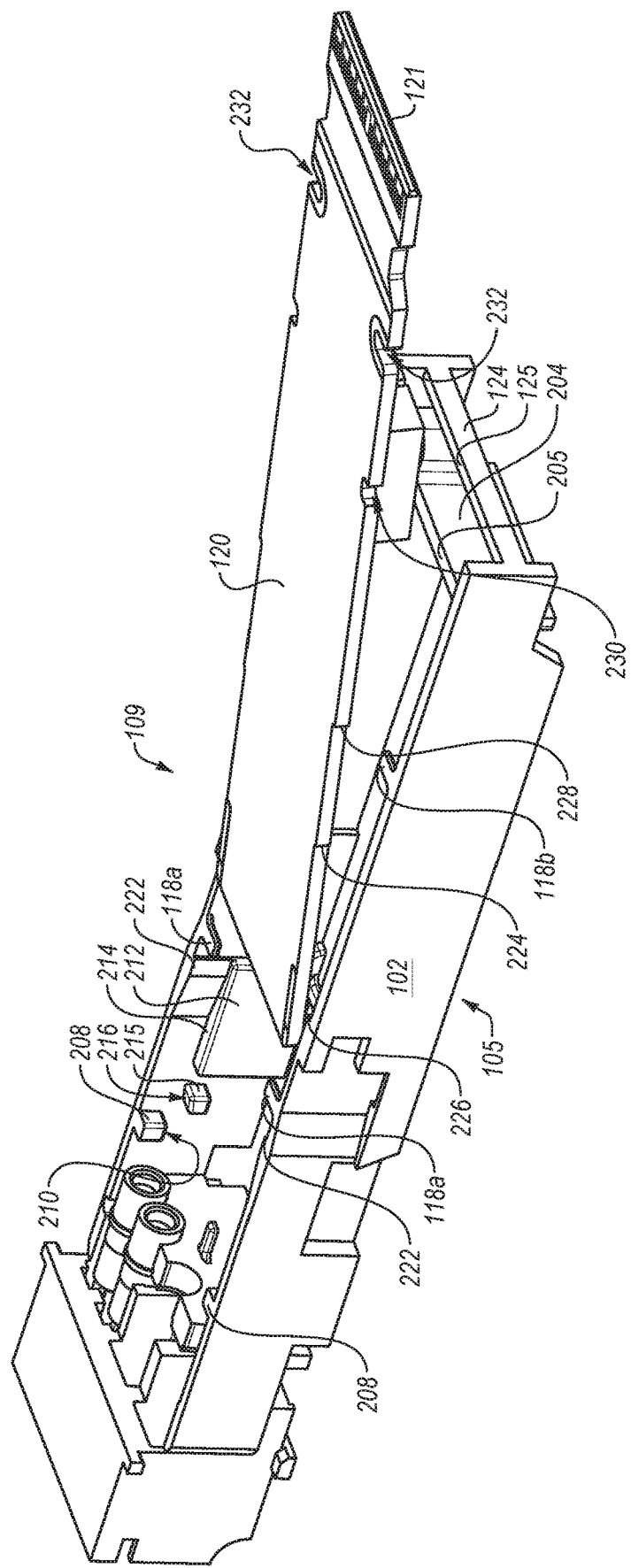
FIG. 3A shows a bottom perspective view of the housing of FIGS. 1A-2B and a PCB of FIGS. 1A and 1B in first relative assembly positions.

FIG. 3A shows a bottom perspective view of the housing 102 and the PCB 120 in first relative assembly positions. With continued reference to FIGS. 2A and 2B, as shown in FIG. 3A the PCB 120 may be inserted into the housing 102 via the bottom 109 of the housing 102. The PCB 120 may be inserted into the housing 102 between a frontward pair of fiber retention tabs 118 (indicated as frontward fiber retention tab 118a at FIGS. 3A-3C) and a rearward pair of fiber retention tabs 118 (indicated as rearward fiber retention tab 118b at FIGS. 3A-3C).

Figure 3B:
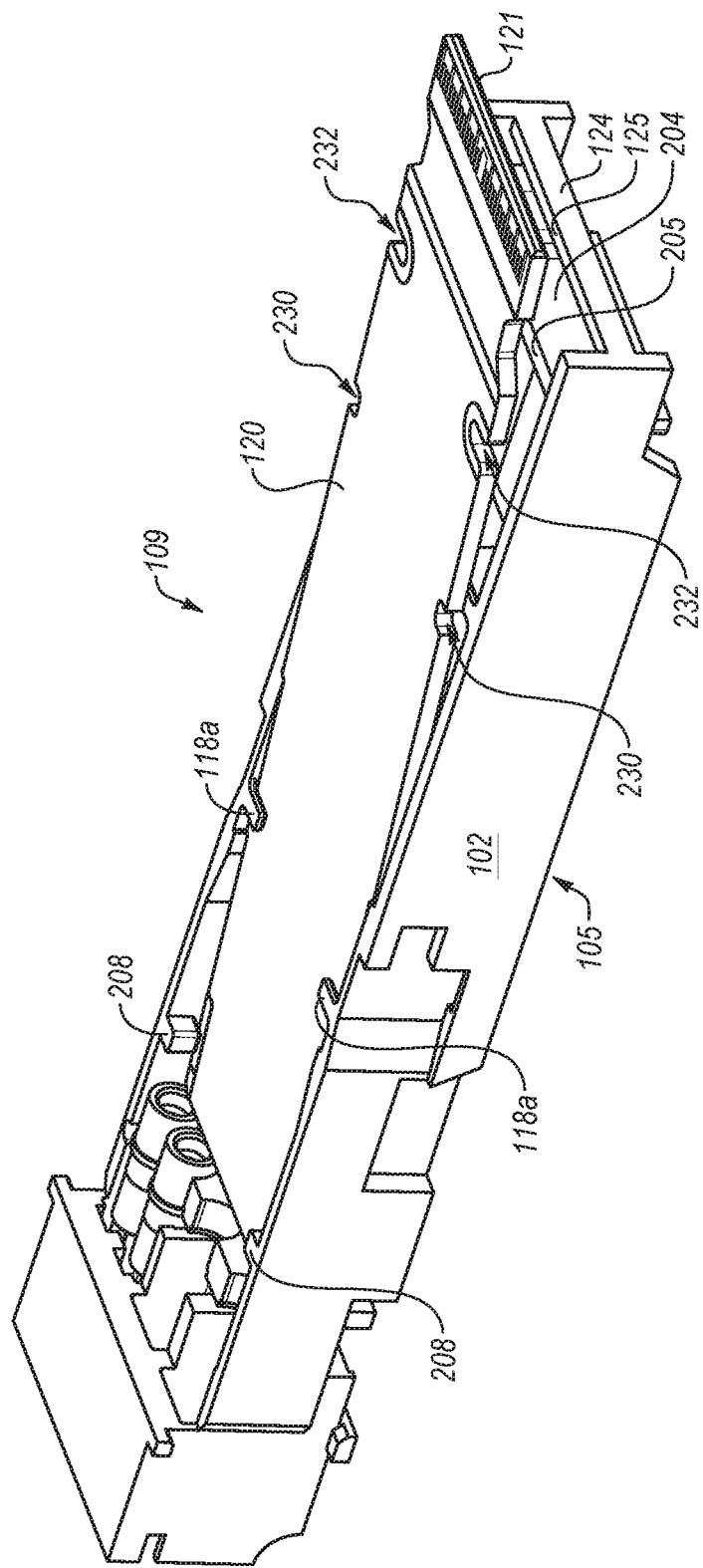
FIG. 3B shows a bottom perspective view of the housing and the PCB in second relative assembly positions.

FIG. 3B shows a bottom perspective view of the housing 102 and the PCB 120 in second relative assembly positions. With continued reference to FIGS. 2A and 2B, as shown in FIG. 3B the PCB 120 may be further inserted into the housing 102 such that the PCB 120 contacts the ramp surface 216. At this position, the first seating surface 210 faces the bottom 109 side of the PCB 120. The ramp surface 216 and the second seating surface 214 face the top 105 side of the PCB 120. The PCB 120 is located within the housing 102 where the frontward fiber retention tabs 118a are located. The PCB 120 is further located outside of the housing 102 where the rearward fiber retention tab 118b and the locking protrusion 218 are located. The PCB 120 may define an opening 230 and an opening 232, which may be aligned, respectively, with the rearward retention tab 118b and the locking protrusion 218.

Figure 3C:
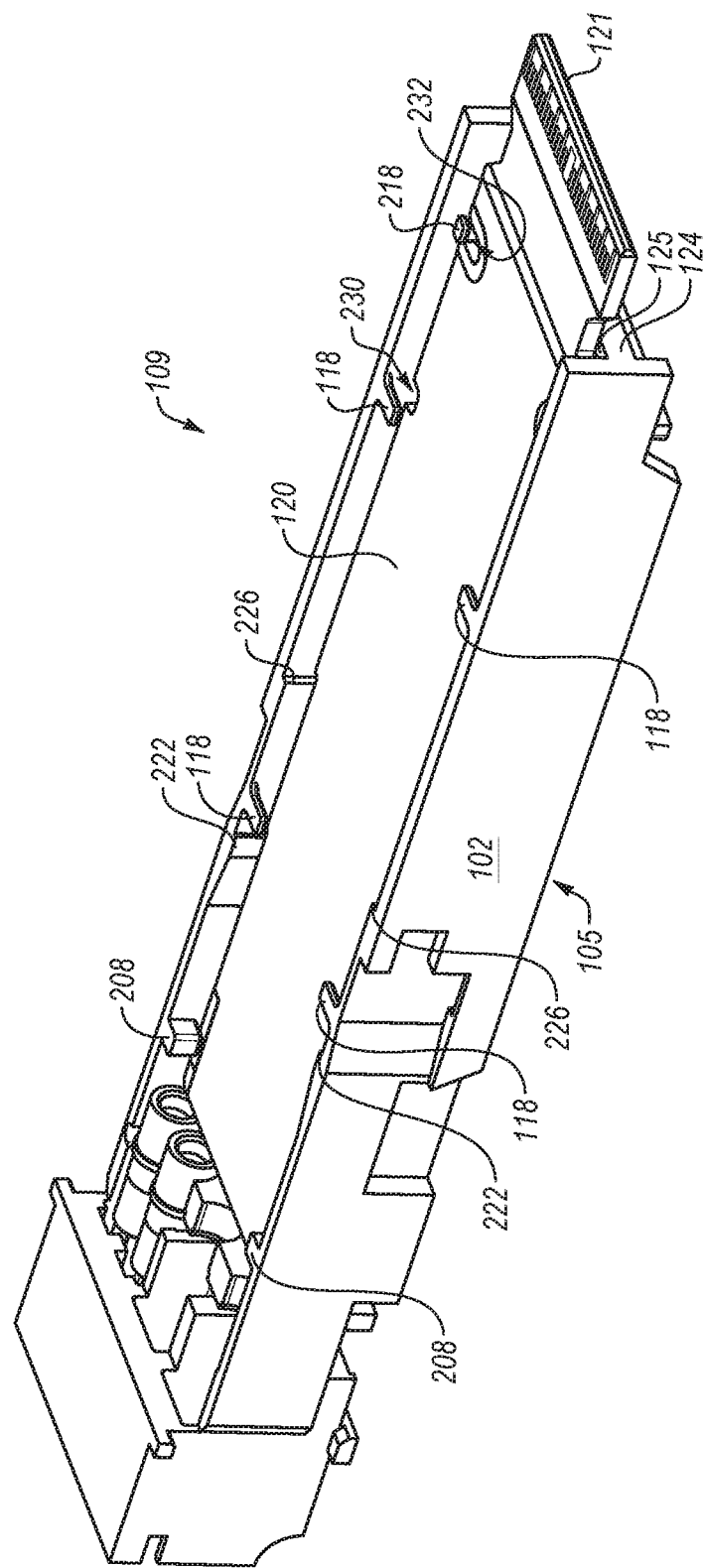
FIG. 3C shows a bottom perspective view of the housing and the PCB in third relative assembly positions.
Figure 3D:
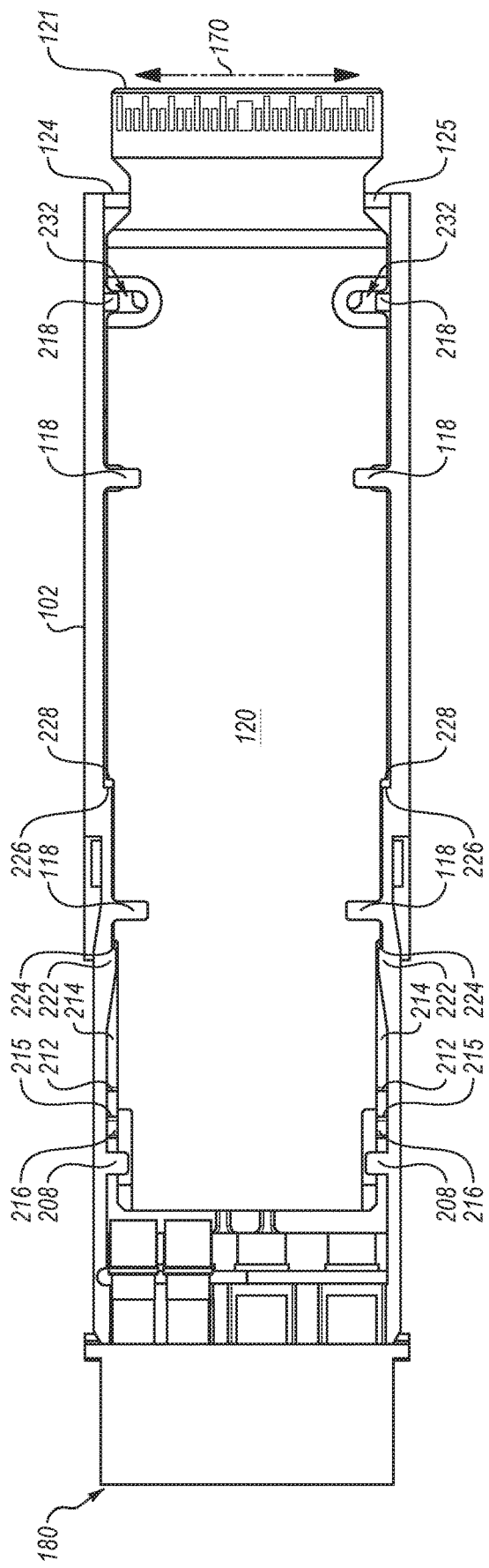
FIG. 3D shows a bottom view of the housing and the PCB in the third relative assembly positions of FIG. 3C.

FIG. 3C shows a bottom perspective view and FIG. 3D shows a bottom view of the housing 102 and the PCB 120 in third relative assembly positions. As shown in FIG. 3C and FIG. 3D, the PCB 120 may be inserted into the housing 102 such that the rearward retention tab 118b passes through the opening 230 and the locking protrusion 218 passes through the opening 232. Accordingly, for example, the PCB 120 may be oriented horizontally relative to the housing 102.

As may best be seen in FIG. 3D, the housing 102 may include a lateral positioning protrusion 222 to facilitate positioning the PCB 120 in the lateral direction 170. The PCB 120 may include a notch 224 configured to interface with the lateral positioning protrusion 222 such that the housing 102 restricts how far the PCB 120 may be inserted towards the front 180 of the housing 102. Optionally, the housing 102 may also include a step 226 and the PCB 120 may further include a notch 228, which may further act to restrict how har the PCB 120 may be inserted towards the front of the housing 102. The notch 224 and the notch 228 may further increase a usable area of the PCB 120, as the PCB 120 may be wider in portions of the housing 102 that may accommodate wider sections of the PCB 120.

Figure 3E:
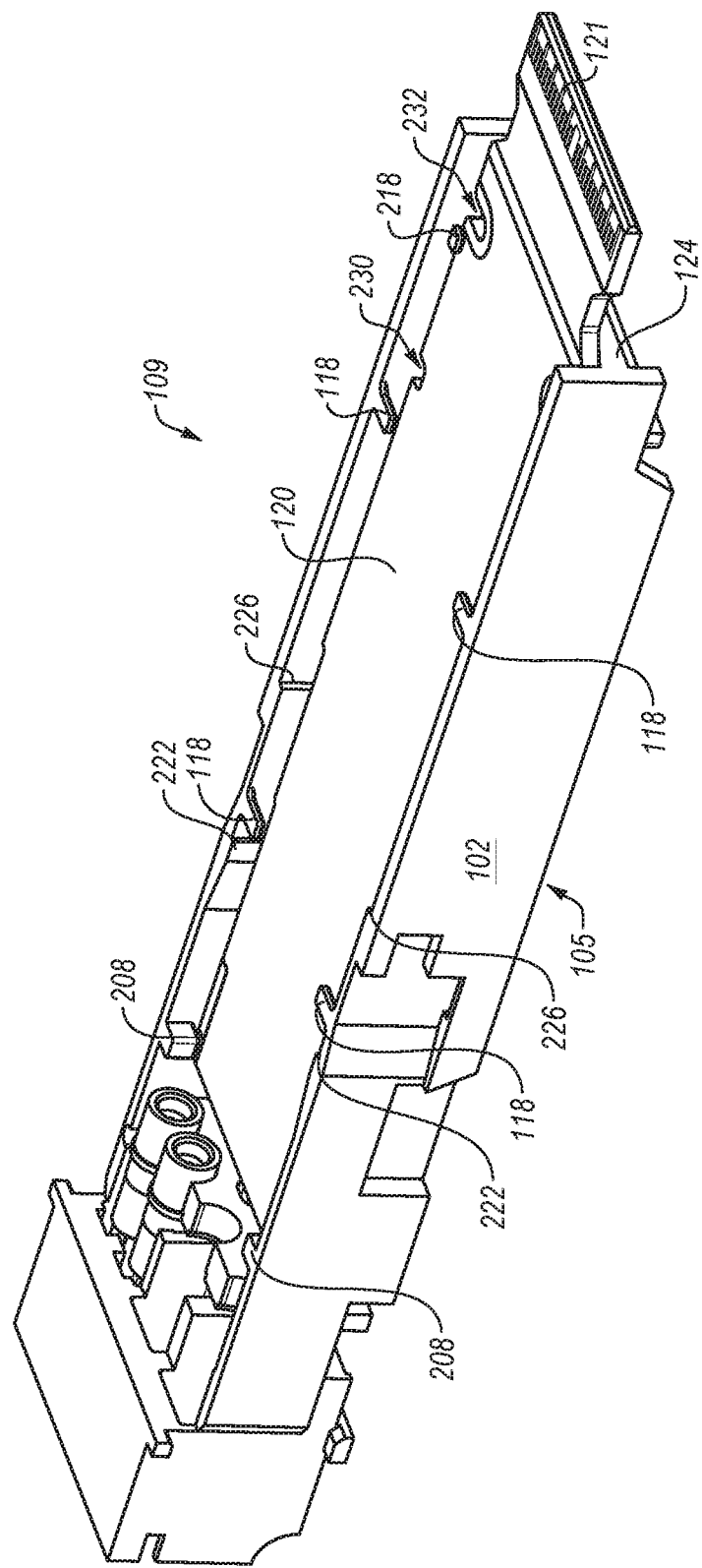
FIG. 3E shows a bottom perspective view of the housing and the PCB in fourth relative assembly positions.
Figure 3F:
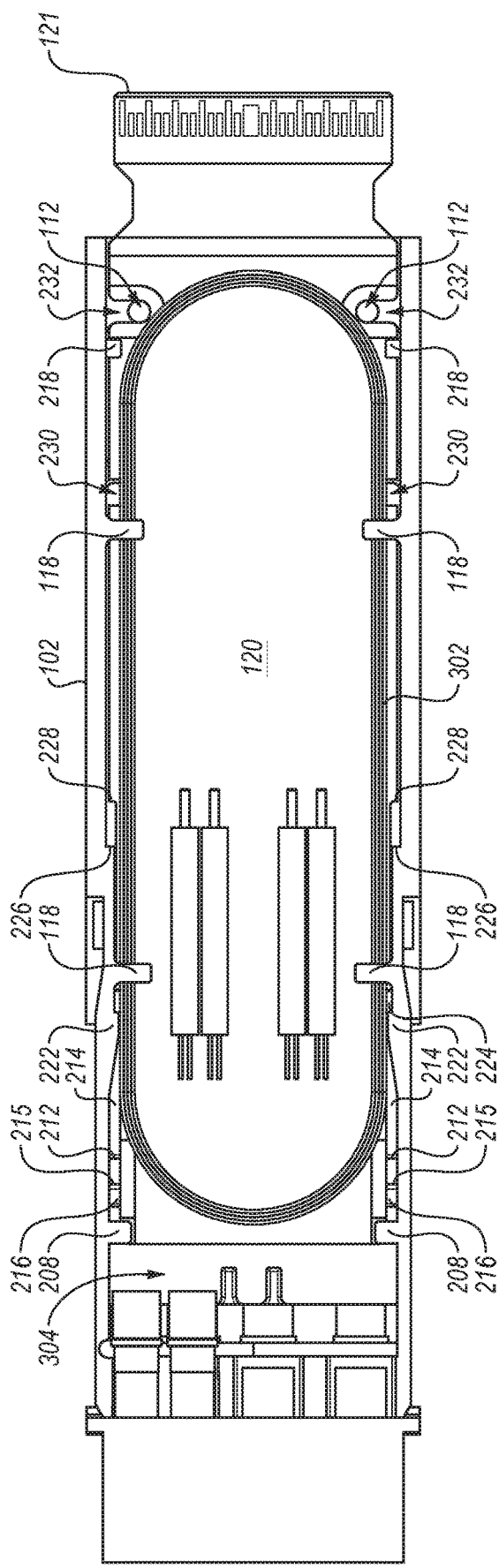
FIG. 3F shows a bottom view of the housing and the PCB in the fourth relative assembly positions of FIG. 3E.

FIG. 3E shows a bottom perspective view and FIG. 3F shows a bottom view of the housing 102 and the PCB 120 in fourth relative assembly positions. With continued reference to FIGS. 2A and 2B, as shown in FIG. 3E and FIG. 3F the PCB 120 may be moved in the longitudinal direction 160 towards the rear 190 of the housing 102. To move the PCB 120, friction between the PCB 120 and the housing 102 may be overcome. For instance, friction between the PCB 120 and the first seating surface 210, the second seating surface 214, the locking surface 220, the cross-wall surface 205, and the crossbar surface 125 may be overcome to move the PCB 120 from the position of FIG. 3C and FIG. 3D to the position of FIG. 3E and FIG. 3F. In some configurations, the friction may be overcome by a human assembler. The friction may hold the PCB 120 in place relative to the housing 102 in the position of FIGS. 3E and 3F such that the assembly process may be completed.

The locking protrusion 218 may have a width approximately equal to a diameter of a threaded portion of the fasteners 110. For example, the locking protrusion 218 and the fasteners 110 may both fit within the opening 232 of the PCB 120. In some configurations, one or more fasteners 110 may optionally be inserted through the opening 232 and made to mate with the fastener retention holes 112 such that the fasteners 110 may assist in holding the PCB 120 in place relative to the housing 102 during assembly. Following the assembly of the PCB 120, the fasteners 110 may be removed and re-inserted to hold the top cover 104 and the bottom cover 108 of FIG. 1A and FIG. 1B in place. For example, the fasteners 110 may facilitate securing the PCB 120 in the longitudinal direction 160 and the lateral direction 170. As the PCB 120 may be secured through a limited number of fasteners and openings, such as the opening 230 and the opening 232, a usable area of the PCB 120 may be relatively larger than with a PCB that used additional fasteners and openings for securing the PCB.

As noted, the fiber retention tabs 118 may facilitate positioning optical fibers 302 (shown in FIG. 3F) within the housing 102 during assembly of the transceiver 100. For instance, the fiber retention tabs 118 may position the optical fibers such that the optical fibers may be discouraged from being crushed between the housing 102 and the top cover 104 or the bottom cover 108 as the top cover 104 or the bottom cover 108 are fastened to the housing. In some embodiments, the elasticity of the optical fibers may encourage the optical fibers to press against the housing 102 and stay positioned under the fiber retention tabs 118 when the optical fibers are bent to be located within the housing 102.

In some embodiments, the PCB 120 and the housing 102 may define a gap 304 between the PCB 120 and the housing 102. The gap 304 may facilitate passage of the optical fibers 302 from one side of the PCB 120 to the other side of the PCB 120 while reducing or eliminating a risk that the optical fibers 302 may be crushed.

With respect to the use of substantially any plural or singular terms herein, those having skill in the art can translate from the plural to the singular or from the singular to the plural as is appropriate to the context or application. The various singular/plural permutations may be expressly set forth herein for sake of clarity. A reference to an element in the singular is not intended to mean "one and only one" unless specifically stated, but rather "one or more." The described aspects are in all respects illustrative and not restrictive. The claimed subject matter is indicated by the appended claims rather than by the foregoing description. All changes which come within the meaning and range of equivalency of the claims are to be embraced within the scope of the claims.

What is claimed is:

1. A housing for a pluggable module, the housing usable with a printed circuit board (PCB) having first and second sides and first and second ends, the housing comprising sidewalls disposed along the housing and enclosing an enclosure space of the housing, the sidewalls having a plurality of protrusions configured to support the PCB insertable in the housing, the protrusions including:

a first seating protrusion having a first seating surface, the first seating surface facing a first direction inward to the enclosure space;

a second seating protrusion having a second seating surface, the second seating surface facing a second direction outward from the enclosure space opposite the first direction, the second seating surface positioned parallel to the first seating surface, the second seating surface offset relative to the first seating surface in a direction parallel to the first seating surface, the second seating surface offset relative to the first seating surface in a direction perpendicular to the first seating surface; and a locking protrusion having a locking surface, the locking surface facing the first direction inward to the enclosure space, the locking surface positioned parallel to the first seating surface, the locking surface offset relative to the first seating surface in the direction perpendicular to the first seating surface, wherein the first and second seating surfaces are configured to receive the first end of the PCB inserted between the first and second surfaces at an angle, the first and second seating surfaces configured to support the first and second sides of the PCB pivoted parallel to the housing; and wherein the locking surface at the second longitudinal offset is configured to support the first side of the PCB toward the second end thereof.

2. The housing of claim 1, wherein the protrusions further comprise a ramp protrusion having a ramp surface, the ramp surface positioned oblique to the first seating surface and facing the second direction outward from the enclosure space, the ramp surface offset relative to the first seating face in the direction parallel to the first seating surface, the ramp surface offset relative to the first seating surface in the direction perpendicular to the first seating surface, wherein the first seating surface and the ramp surface are configured to receive the first end of the PCB inserted therebetween.

3. The housing of claim 1, further comprising a plurality of fiber retention tabs disposed on the sidewalls.

4. The housing of claim 1, further comprising a cross-wall disposed between the sidewalls and having a cross-wall surface facing the second direction outward from the enclosure space, the cross-wall surface positioned parallel to the second seating surface.

5. The housing of claim 1, further comprising a crossbar disposed between the sidewalls and having a crossbar surface facing the second direction outward from the enclosure space, the crossbar surface positioned parallel to the second seating surface.

6. The housing of claim 1, wherein the housing defines a fastener retention hole open in the first direction and the second direction.

7. The housing of claim 1, further comprising a lateral alignment protrusion configured to engage a notch in an edge of the PCB.

8. The housing of claim 1, wherein the protrusions further comprise a step configured to engage a notch in an edge of the PCB.

9. An optoelectronic transceiver module comprising:

a printed circuit board (PCB) having first and second sides and having first and second ends, the PCB defining an opening in an edge of the PCB; and a housing having sidewalls, the sidewalls disposed along the housing and enclosing an enclosure space of the housing, the sidewalls having a plurality of protrusions configured to support the PCB insertable in the housing, the protrusions including:

a first seating protrusion having a first seating surface, the first seating surface facing the first side of the PCB inserted in the housing;

a second seating protrusion having a second seating surface, the second seating surface facing the second side of the PCB inserted in the housing, the second seating surface positioned parallel to the first seating surface, the second seating surface offset relative to the first seating surface in a direction parallel to the first seating surface, the second seating surface offset relative to the first seating surface in a direction perpendicular to the first seating surface, the first end of the PCB being insertable between the first and second seating protrusions, the second end of the PCB being pivotable about the inserted first end; and a locking protrusion having a locking surface, the locking surface facing the first side of the PCB inserted in the housing, the locking surface positioned parallel to the first seating surface, the locking surface offset relative to the first seating surface in the direction perpendicular to the first seating surface, the opening of the PCB being passable past the locking protrusion aligned therewith in the pivot of the PCB, the PCB being slideable between the first and second seating surfaces and the locking surface to misalign the locking protrusion from the opening.

10. The optoelectronic transceiver module of claim 9, wherein the protrusions further comprise a ramp protrusion having a ramp surface, the ramp surface facing the second side of the PCB inserted in the housing, the ramp surface positioned oblique to the first seating surface, the ramp surface offset relative to the first seating face in the direction parallel to the first seating surface, the ramp surface offset relative to the first seating surface in the direction perpendicular to the first seating surface, the first end of the PCB being insertable between the first seating protrusion and the ramp protrusion.

11. The optoelectronic transceiver module of claim 9, further comprising optical fiber, wherein the sidewalls of the housing further includes a plurality of fiber retention tabs, and wherein the optical fiber is positioned within the enclosure space of the housing at least in part by the plurality of fiber retention tabs.

12. The optoelectronic transceiver module of claim 9, wherein the housing further comprises a cross-wall disposed between the sidewalls and having a cross-wall surface facing the second side of the PCB inserted therein, the cross-wall surface positioned parallel to the second seating surface.

13. The optoelectronic transceiver module of claim 9, wherein the housing further comprises a crossbar disposed between the sidewalls and having a crossbar surface facing the second side of the PCB inserted, the crossbar surface positioned parallel to the second seating surface.

14. The optoelectronic transceiver module of claim 9, further comprising:

a cover defining a fastener opening and configured to position over the enclosure space of the housing; and a fastener, wherein the housing defines a fastener retention hole, and wherein the fastener is positioned in the fastener opening of the cover, the opening of the PCB, and the fastener retention hole of the housing.

15. The optoelectronic transceiver module of claim 9, wherein the sidewalls of the housing further includes a plurality of fiber retention tabs, and wherein the PCB further defines a second opening sized and shaped to pass a first fiber retention tab of the plurality of fiber retention tabs through the second opening.

16. The optoelectronic transceiver module of claim 9, wherein the housing further includes a lateral alignment protrusion.

17. The optoelectronic transceiver module of claim 16, wherein the PCB includes a notch and wherein the lateral alignment protrusion is positioned to contact the notch and restrict movement of the PCB.

18. The optoelectronic transceiver module of claim 9, wherein the PCB is positioned relative to the housing to define a gap between the PCB and the housing.

19. An optoelectronic transceiver module comprising:

a printed circuit board (PCB) having first and second sides and having first and second ends, the PCB defining slots in edges of the PCB; and a housing comprising sidewalls disposed parallel along the housing and enclosing an enclosure space of the housing;

pairs of seating protrusions disposed on the sidewalls toward one end of the housing, one of the pairs of seating protrusions offset longitudinally and laterally from another of the pairs, the pairs of the seating protrusions being configured to receive the first end of the PCB inserted between the pairs at an angle, the pairs of the seating protrusion being configured to support the first and second sides of the PCB pivoted parallel to the housing; and locking protrusions disposed toward an opposite end of the housing, the slots of the PCB being passable past the locking protrusions aligned therewith in the pivot of the PCB, the PCB pivoted parallel to the housing being slideable between the sidewalls to misalign the locking protrusion from the slots, the misaligned locking protrusions being configured to support the first side of the PCB toward the second end thereof.

* * * * *